Feb. 1, 1938.  H. RUMSEY, JR  2,107,086
METHOD OF FORMING MEAT PRODUCTS
Filed June 25, 1936   3 Sheets-Sheet 1
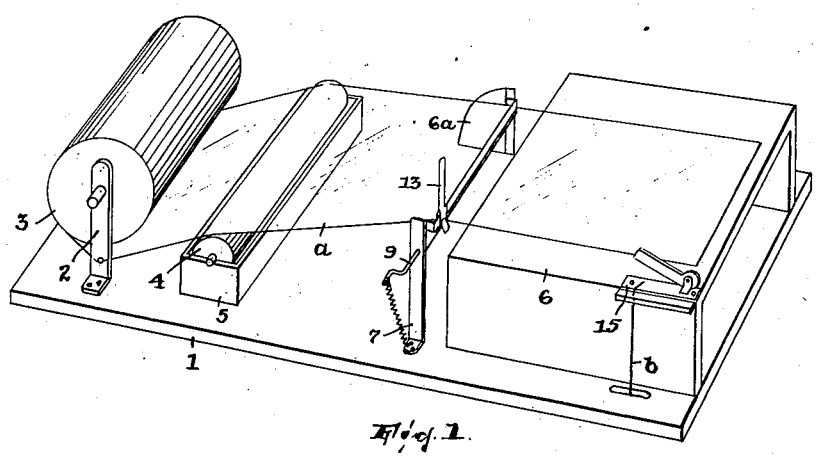
Fig. 1.
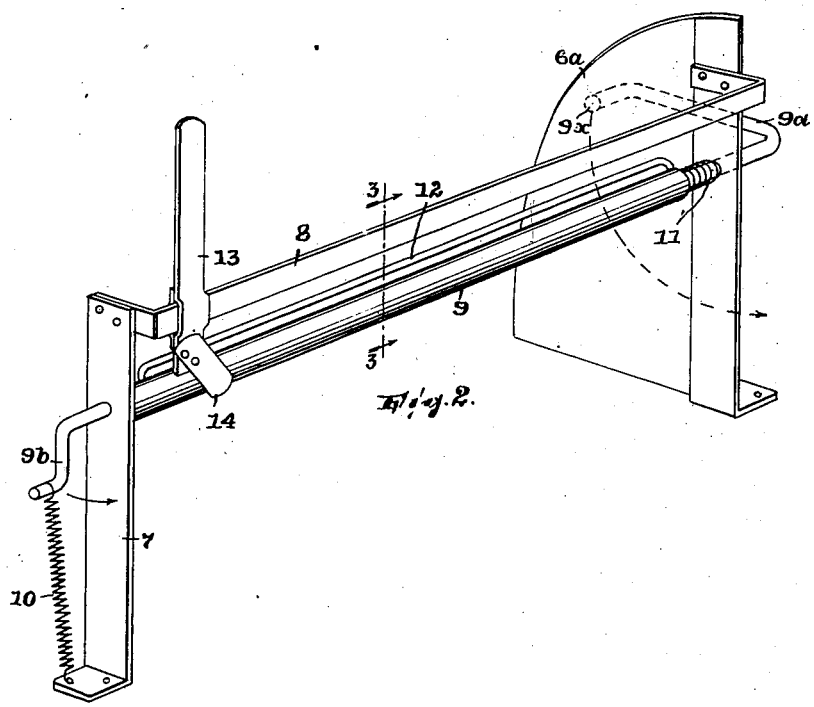
Fig. 2.
Fig. 3.
INVENTOR,
Herbert Rumsey, Jr.,
BY
ATTORNEY.

Feb. 1, 1938. H. RUMSEY, JR 2,107,086
METHOD OF FORMING MEAT PRODUCTS
Filed June 25, 1936    3 Sheets-Sheet 2

INVENTOR,
Herbert Rumsey, Jr.,
BY John N. Steward.
ATTORNEY.

Feb. 1, 1938.  H. RUMSEY, JR  2,107,086
METHOD OF FORMING MEAT PRODUCTS
Filed June 25, 1936  3 Sheets—Sheet 3

INVENTOR,
Herbert Rumsey, Jr.,
BY
John Steward
ATTORNEY.

Patented Feb. 1, 1938

2,107,086

UNITED STATES PATENT OFFICE 2,107,086

METHOD OF FORMING MEAT PRODUCTS

Herbert Rumsey, Jr., Nutley, N. J.

Application June 25, 1936, Serial No. 87,238

8 Claims. (Cl. 99—174)

This invention relates to the packaging of rotund bodies, as those formed generally cylindrical and with rounded ends and usually plastic, especially such meat products as pork-butts or boneless meat pieces from the shoulders of hogs. After curing and soaking pork butts are compressed to reduce them to such generally cylindrical form with rounded ends and in their thus-compressed state they are smoked, thus incidentally drying and so tending to set in that form: see, for instance, my application Serial No. 51,093.

It is now a custom to dispense the butts as thus preformed in sheet cellophane, usually transparent. The packer endeavors to wrap each butt in the cellophane sheet so as to form a product having the sheet embracing the butt tightly or as little wrinkled as possible and so as nearly as possible giving the product a smooth, glazed appearance. To this end it is known to roll and thus envelop the butt in a cellophane sheet whose lateral portions extend beyond the ends of the butt on both hands, then twist such extending portions and finally bind the twists or twisted "tails" thus formed with twine. But it is not possible to attain the ideal in this way with cellophane which is resistant to moisture, and if the cellophane be of the kind which absorbs moisture, as during refrigeration of the product, and thereupon will yield to stretching or extending by handling, however smoothly its wrapper may be initially formed it assumes a badly wrinkled and loose condition when the product is handled while the wrapper is in moist state.

This invention contemplates incorporating a pork-butt or equivalent rotund body in a casing of celophane or other material such as that last indicated and then stretching the casing, having been wetted, so that it will be stretched or extended beyond its normal or dry state and thereupon maintaining the casing in stretched state until it dries, thus to attain a product whose casing shall remain smoothly related to the contained body notwithstanding exposure to moisture or dampness with handling. The stretch possible in such cellophane material is usually much more pronounced in the direction transverse of the strip in which it is formed than in the longitudinal direction, and this I take into account in carrying out the invention.

In the drawings,

Fig. 1 is a perspective view of apparatus which may be used in performing the method of this invention;

Fig. 2 is a similar view, on a larger scale, of the part of said apparatus by which the cellophane strip is gripped and the sheet severed therefrom;

Fig. 3 is a section on line 3—3, Fig. 2, of parts of the apparatus;

Figure 4:
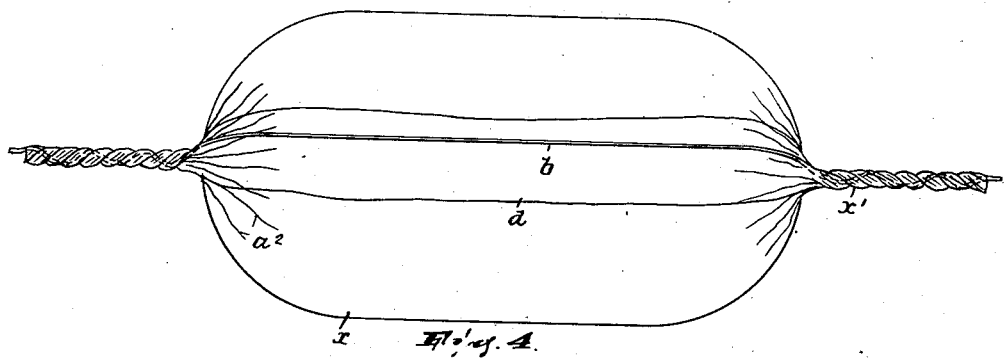
Figs. 4 and 5 are, respectively, what I term a face view and a rear view of one form of the product partly formed.

The mentioned apparatus is as follows: On a bed 1 in brackets 2 is journaled a roll 3 of the strip a of cellophane (shown transparent) from which to cut a sheet for the wrapping of a butt. The strip extends over a roller 4, which dips in water contained in a receptacle 5, and then past a gripping and cutting means and over a table 6 where the operations for forming the product are performed. Said means comprises two standards 7 braced by a bar 8 and having journaled therein a shaft 9 parallel with the bar and having a crank 9a formed with a return 9x as shown and at the other end a crank 9b; the shaft is normally held in the position shown by a spring 10 connecting crank 9b with the bed, at which time the return 9x of crank 9a is opposed to a plate 6a which may be an extension of the right-hand standard, being held against such plate by a spring 11 interposed between said standard and a shoulder on the shaft. When the shaft is rocked in the direction of the arrow, Fig. 2, so that the return 9x clears the right-hand standard spring 11 shifts the shaft to the left so that said return engages the front edge of the standard and locks the shaft against return. The shaft between the standards is equipped with a rod 12 parallel therewith and spaced therefrom and between which and the shaft the strip is to extend; parts 9—12 are to form a strip-gripping device. On the bar 8 is a slide 13 provided with a knife 14. On the bed is a cutting attachment 15 for a wire b to be drawn from any suitable supply (not shown).

Figure 6:
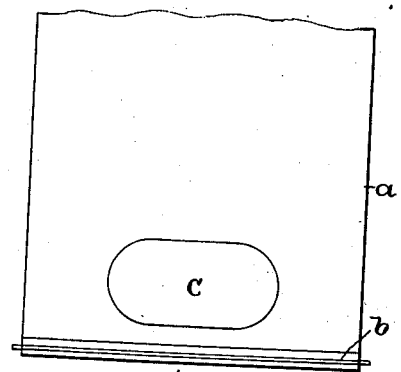
Fig. 6 is a plan and Fig. 7 a side elevation (both being diagrammatic) of the strip, a wire and the butt all as used in the production of this form.
Figure 7:
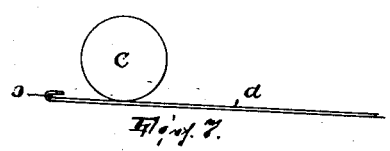
Fig. 7a is a view of the casing, formed, and contained butt as viewed laterally with respect to the butt.

Referring, first, to Figs. 1 to 7a: The operator draws the flexible cellophane strip a from the roll over the strip-wetting roller 4 and between the shaft 9 and bar 12 until its leading edge approximates the right-hand margin of the table, whereupon he shifts the gripping device to its described locked position or where its parts 8—12 will form a double bend in and thus grip the wetted strip (see Fig. 3). He then folds over the leading edge of the strip as shown in Fig. 6 upon the wire b, which has been drawn across the sheet, and severs the wire by means of the attachment 15, there being left enough wire to at least about span the strip. He then places a butt c on the portion of the strip lying on the table and, depending upon the gripping device to hold the strip firmly, envelops the butt as tightly as he can in the strip, rolling the butt from him and over the table. The effect is to form a substantially cylindrical casing (Fig. 7a) whose extremities a3 extend beyond the butt in opposite directions. While holding the casing in its thus snug relation to the butt by pressure directed toward the table he severs the strip by the knife 14. While still holding the casing in snug relation to the butt he forms with his hands its said extremities and contained wire extremities into as tight twisted tails x' as he can, the twists in the wire developing helically, as shown by dotted lines in Figs. 4 and 5. Then lifting the encased butt x by such twisted extremities he deposits it again on the table and rolls it from him while securely holding the twists, thus to increase the twist in both casing and wire extremities; he may repeat this latter operation one or more times with the object and effect of causing an appreciable stretching of the part of the casing (still wet) between its extremities and immediately containing the butt, preferably to such an extent as more or less to approximate the rupture point and even in some cases involving such compression of the butt, depending on the degree of plasticity thereof, that it becomes somewhat condensed as in Fig. 5 where the dotted outline schematically indicates the original contour of the butt. In their new or twisted form the extremities of the wire are a factor in opposing untwisting and hence contraction of the casing until drying thereof can ensue and preferably they positively prevent such untwisting, as when the wire is stiff enough, it being understood that it has the property of retaining its new form when bent and in the absence of extraneous force acting to return it to its original form.

When the product thus formed is allowed to dry the casing exists quite smooth at substantially all points excepting where folds, as a2, were necessarily formed in the casing at the extremities of the butt, and even these exist as quite flat creases. And, especially if the stretching is done to more or less near the rupture point and untwisting is substantially positively prevented by the wire subsequent moisture and handling of the product will not effect stretching and incidental wrinkling of the casing.

Figure 10:
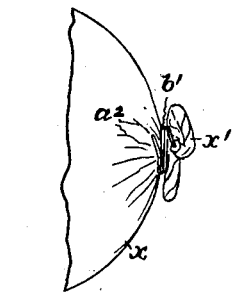
Fig. 10 is a fragmentary rear view of a modification of the latter form of the product.
Figure 5:
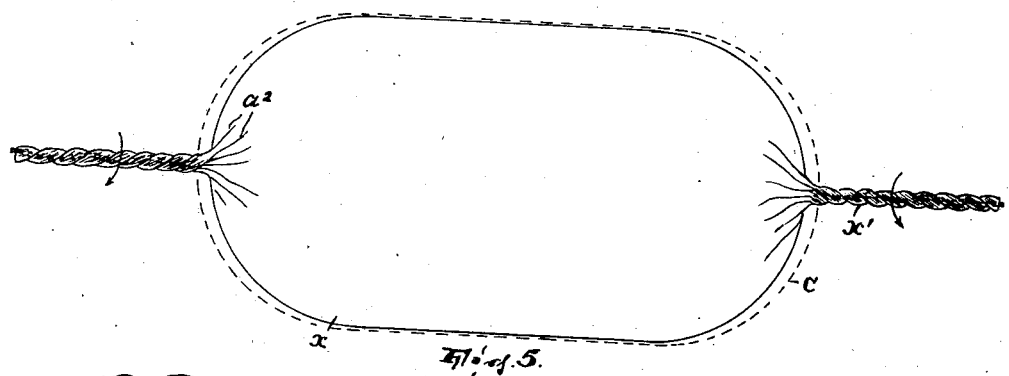
Figures 8, 9:
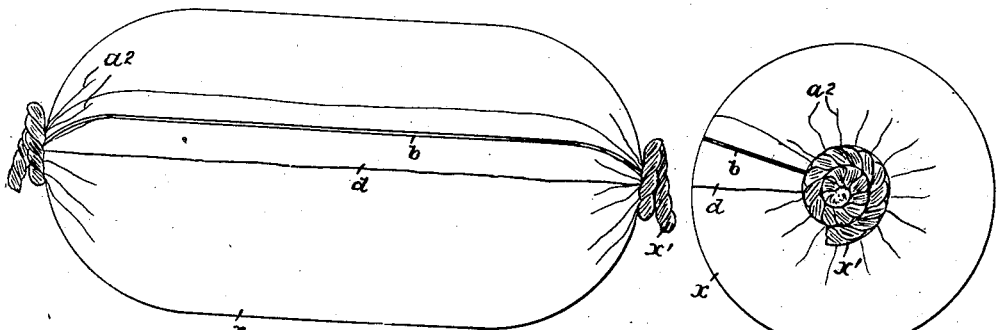
Figs. 8 and 9 are a face and end view, respectively, of another form of the product.
Figure 7A:
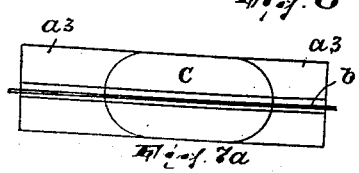

A factor in opposing the untwisting of the casing extremities may be that illustrated in Figs. 8 and 9 where after twisting such extremities they are formed into spiral coils or pigtails; this also gives a finished appearance to the product. If the twisted wire extremities are present as already described, the untwisting will of course be further opposed and may be positively prevented. Further, if the wire be made long enough to extend appreciably from one of the coils it may itself be coiled between such coil and the end of the butt around the base of the coil, as at b', Fig. 10.

Figure 11:
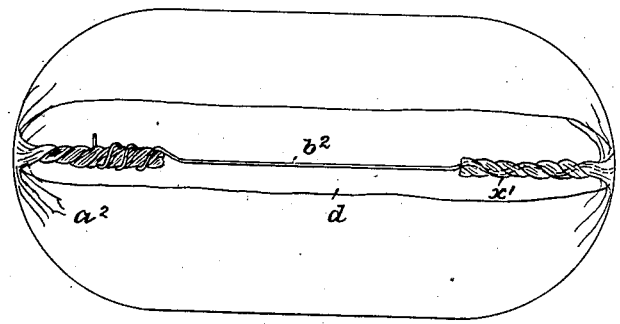
Figs. 11 and 12 are face and end views of two other forms of the product.
Figure 12:
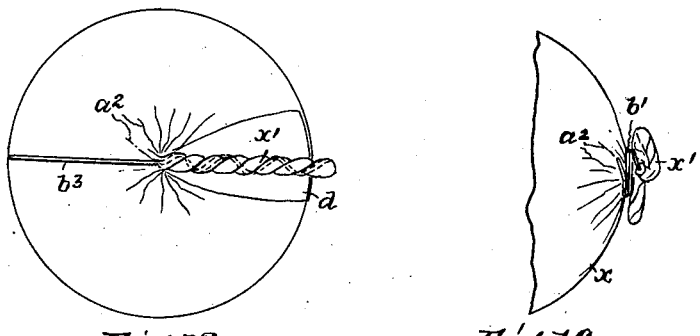

Or a factor in opposing the untwisting of the casing extremities may be that illustrated in Fig. 11 where the twisted casing extremities are bent back upon the encased butt toward each other and bound together. In this case the wire is shown of such length as to extend, as at b2, from one such extremity to and be wrapped around the other, thus binding the tails in their bent-back relation to the encased butt. Here, again, a finished appearance is imparted to the product.

Figure 13:
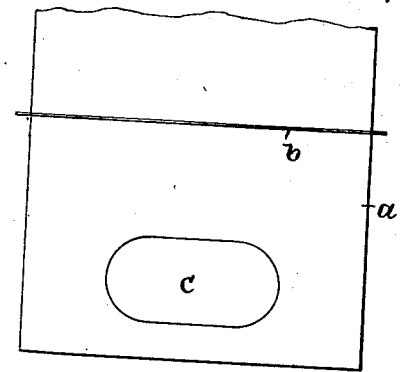
Fig. 13 is a diagrammatic plan of the strip, wire and butt used in the forming of the product of Fig. 12.

As so far described the sheet to form the casing is assumed to have a fold receiving the wire. If this is so then where the folded edge of the sheet forms a lap, as d, with the opposite edge such lap will be held by the wire in snug relation to the butt. But the fold may be absent and the wire initially positioned as in Fig. 13 so that in the completed product the wire will extend, not across the face, but, as at b3, across the back of the butt and between it and the casing; and if it is desired in such case to keep the lap formed by the leading and relatively opposite edges of the sheet in snug relation to the butt this may be done by following the construction of Fig. 11 and disposing the connected casing extremities coincident with the lap.

In the appended claims by the expression "casing of the material herein defined" I mean a casing of cellophane or any other material which, when it absorbs moisture, is capable of being stretched or extended beyond its normal dimension and which, in resuming the dry state, acts to contract or return to its normal dimension. And when reference is made to the "wire" extremities or portions being bent or twisted I mean that expression to include extremities or portions of any attenuated flexible device which like wire, to wit, of metal, has the property of retaining its new form when bent and in the absence of extraneous force to return it to its original form.

In the examples the stretch is maintained by expedients inherent in the product, but that of course is not indispensable.

Having thus fully described my invention what I claim is:

1. The method of packaging a rotund body which consists in incorporating the body in a substantially cylindrical casing of the sheet material herein defined and so that the extremities of the casing shall extend beyond the body in opposite directions, and then, having wetted the material of the casing throughout substantially the whole extent of the latter, twisting said extremities while the casing is wet and said body is so incorporated and until the part of the casing between the twists formed is stretched, and maintaining said extremities in substantially their thus twisted form and hence the casing in substantially the degree of stretch attained until the casing dries.

2. The method of packaging a rotund body which consists in incorporating the body in a substantially cylindrical casing of the sheet material herein defined and so that the extremities of the casing shall extend beyond the body in opposite directions, and then, having wetted the material of the casing throughout substantially the whole extent of the latter, twisting together with said extremities wire portions while said body is so incorporated and until the part of the casing between the twists thus formed is stretched.

3. The method of packaging a rotund body which consists in incorporating the body in a substantially cylindrical casing of the sheet material herein defined and so that the extremities of the casing shall extend beyond the body in opposite directions, and then, having wetted the material of the casing throughout substantially the whole extent of the latter, twisting said extremities while said body is so incorporated and until the part of the casing between the twists formed is stretched, and forming the twisted extremities into spiral coils while the casing is so stretched.

4. The method of packaging a rotund body which consists in incorporating the body in a substantially cylindrical casing of the sheet material herein defined and so that the extremities of the casing shall extend beyond the body in opposite directions, and then, having wetted the material of the casing throughout substantially the whole extent of the latter, twisting together with said extremities wire portions while said body is so incorporated and until the part of the casing between the twists thus formed is stretched, and forming the twisted extremities and wire portions into spiral coils while the casing is so stretched.

5. The method of packaging a rotund body which consists in incorporating the body in a substantially cylindrical casing of the sheet material herein defined and so that the extremities of the casing shall extend beyond the body in opposite directions, wetting the casing and then, having wetted the material of the casing throughout substantially the whole extent of the latter, twisting said extremities while the casing is wet and said body is so incorporated and until the part of the casing between the twists formed is stretched, and bending the thus twisted extremities back upon the casing-contained body and binding said extremities together while the casing is so stretched.

6. The method of packaging a rotund body which consists in incorporating the body in a substantially cylindrical casing of the sheet material herein defined and so that the extremities of the casing shall extend beyond the body in opposite directions, extending a wire at least substantially the full length of the casing, then, having wetted the material of the casing throughout substantially the whole extent of the latter, and twisting said extremities and the wire extremities together while the casing is wet and said body is so incorporated and until the part of the casing between the extremities thereof is stretched.

7. The method of packaging a rotund body which consists in incorporating the body in a substantially cylindrical casing of the sheet material herein defined and so that the extremities of the casing shall extend beyond the body in opposite directions, extending a wire at least substantially the full length of the casing, and then, having wetted the material of the casing throughout substantially the whole extent of the latter, twisting said extremities and the wire extremities together while the casing is wet and said body is so incorporated and until the part of the casing between the extremities thereof is stretched, and forming the twisted casing extremities and wire extremities into spiral coils while the casing is so stretched.

8. The method of packaging a rotund body which consists in incorporating the body in a substantially cylindrical casing of the sheet material herein defined and so that the extremities of the casing shall extend beyond the body in opposite directions, extending a wire at least substantially the full length of the casing, and then, having wetted the material of the casing throughout substantially the whole extent of the latter, twisting said extremities and the wire extremities together into twisted tails while the casing is wet and said body is so incorporated and until the part of the casing between such tails is stretched, and bending the tails back upon the casing-contained body and binding said tails together while the casing is so stretched.

HERBERT RUMSEY, Jr.